United States Patent
Yamamoto et al.

(10) Patent No.: US 8,197,590 B2
(45) Date of Patent: *Jun. 12, 2012

(54) FLUORINE-CONTAINING TREATMENT COMPOSITION

(75) Inventors: Ikuo Yamamoto, Settsu (JP); Shinichi Minami, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 839 days.

This patent is subject to a terminal disclaimer.

(21) Appl. No.: 11/666,428

(22) PCT Filed: Oct. 27, 2005

(86) PCT No.: PCT/JP2005/019786
§ 371 (c)(1),
(2), (4) Date: Apr. 27, 2007

(87) PCT Pub. No.: WO2006/046643
PCT Pub. Date: May 4, 2006

(65) Prior Publication Data
US 2007/0295245 A1    Dec. 27, 2007

(30) Foreign Application Priority Data

Oct. 29, 2004  (JP) .................. 2004-316045

(51) Int. Cl.
*C08K 5/00* (2006.01)
*C08G 18/30* (2006.01)
(52) U.S. Cl. .................. 106/287.25; 8/115.51; 560/227; 524/368; 524/375; 524/507; 524/520; 528/28; 528/70; 252/182.15
(58) Field of Classification Search .................. 524/368, 524/375, 507, 520; 528/28, 70; 252/182.15; 106/287.25; 8/115.51; *C08K 5/00; C08G 18/30*
See application file for complete search history.

(56) References Cited

U.S. PATENT DOCUMENTS

| | | | | |
|---|---|---|---|---|
| 3,663,604 A | * | 5/1972 | Blochl | .......................... 560/165 |
| 4,962,156 A | | 10/1990 | Shinjo et al. | |
| 5,021,501 A | | 6/1991 | Ohmori et al. | |
| 5,021,527 A | | 6/1991 | Ohmori et al. | |
| 5,324,763 A | | 6/1994 | Rössler et al. | |
| 6,384,174 B2 | * | 5/2002 | Hanada et al. | .................. 528/70 |
| 7,388,104 B2 | * | 6/2008 | Yamamoto et al. | ........... 560/158 |
| 2003/0204015 A1 | | 10/2003 | Burleigh et al. | |

FOREIGN PATENT DOCUMENTS

| | | |
|---|---|---|
| JP | 63-99285 | 4/1988 |
| JP | 63-146976 | 6/1988 |
| JP | 4-289275 | 10/1992 |
| JP | 5-262847 | 10/1993 |
| JP | 8-120034 | 5/1996 |
| JP | 8-283654 | 10/1996 |
| JP | 2001-329038 | 11/2001 |
| JP | 2001329038 A * | 11/2001 |
| JP | 2002-363244 | 12/2002 |
| WO | WO 96/30584 | 10/1996 |
| WO | 2004013089 A1 | 2/2004 |
| WO | 2005092937 A1 | 10/2005 |

OTHER PUBLICATIONS

"Preliminary Risk Assessment of the Developmental Toxicity Associated with Exposure to Perfluorooctanoic Acid and its Salts"; U.S. Environmental Protection Agency Office of Pollution Prevention and Toxics Risk Assessment Division; Apr. 10, 2003.
"EPA Intensifies Scientific Investigation of a Chemical Processing Aid"; EPA Environmental News; United States Environmental Protection Agency; Monday, Apr. 14, 2003.
EPA OPPT Fact Sheet; United States Environmental Protection Agency; Apr. 14, 2003.
"Perfluorooctanoic Acid (PFOA), Fluorinated Telomers; Request for Comment, Solicitation of Interested Parties for Enforceable Consent Agreement Development, and Notice of Public Meeting"; United States Environmental Protection Agency; Federal Register; vol. 68, No. 73; Wednesday, Apr. 16, 2003; pp. 18626-18633.

* cited by examiner

*Primary Examiner* — Melvin Mayes
*Assistant Examiner* — Jun Li
(74) *Attorney, Agent, or Firm* — Sughrue Mion, PLLC

(57) ABSTRACT

Disclosed is a composition containing a fluorine-containing urethane compound (A) and a fluorine-containing polymer (B) having a repeating unit derived from a fluorine-containing monomer represented by the following formula (I):

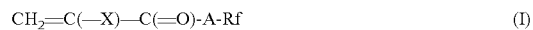

$$CH_2=C(-X)-C(=O)-A-Rf \quad (I)$$

(wherein X represents a fluorine atom, a chlorine atom, a bromine atom, an iodine atom, a $CFX^1X^2$ group (wherein $X^1$ and $X^2$ respectively represent a hydrogen atom, a fluorine atom or a chlorine atom), a cyano group, a straight or branched chain fluoroalkyl group having 1-20 carbon atoms, a substituted or unsubstituted benzyl group, or a substituted or unsubstituted phenyl group;
A represents a divalent group; and
Rf represents a straight or branched chain perfluoroalkyl group having 1-6 carbon atoms).

25 Claims, No Drawings

FLUORINE-CONTAINING TREATMENT COMPOSITION

FIELD OF THE INVENTION

The present invention relates to a treatment composition, particularly a surface treatment composition which imparts excellent water repellency, oil repellency and soil resistance to a textile such as a carpet, a paper, a non-woven fabric, a masonry, an electrostatic filter, a dust protective mask, and a part of fuel cell.

BACKGROUND ART

Hitherto, combinations of a fluorine-containing urethane compound and a fluorine-containing polymer are proposed. For example, US-2003-0204015-A1 discloses a treatment composition comprising a fluorine-containing urethane compound and a fluorine-containing (meth)acrylate/polyoxyalkylene (meth)acrylate copolymer. This treatment composition, however, has the defect that the water- and oil-repellency is not sufficient.

Recent study results (EPA Report "PRELIMINARY RISK ASSESSMENT OF THE DEVELOPMENTAL TOXICITY ASSOCIATED WITH EXPOSURE TO PERFLUOROOCTANOIC ACID AND ITS SALTS" (http://www.epa.gov/opptintr/pfoa/pfoara.pdf)) and the like clarify that a PFOA (perfluorooctanoic acid) doubtfully has a potential risk of environmental load. EPA (Environmental Protection Agency of USA) announced on Apr. 14, 2003 that the EPA intensifies the scientific investigation on PFOA.

On the other hand, Federal Register (FR Vol. 68, No. 73/Apr. 16, 2003 [FRL-7303-8]) (http://www.epa.gov/opptintr/pfoa/pfoafr.pdf), EPA Environmental News for release Monday April, 2003 "EPA INTENSIFIES SCIENTIFIC INVESTIGATION OF A CHEMICAL PROCESSING AID" (http://www.epa.gov/opptintr/pfoa/pfoaprs.pdf), and EPA OPPT FACT SHEET Apr. 14, 2003 (http://www.epa.gov/opptintr/pfoa/pfoafacts.pdf) announced that a "telomer" may possibly metabolize or decompose to PFOA. It is also announced that the "telomer" is used in a large number of commercial products including fire fighting foams, care products and cleaning products as well as soil, stain and grease resistant coating on carpets, textiles, paper, and leather.

DISCLOSURE OF THE INVENTION

Problems to be Solved by the Invention

An object of the present invention is to provide a treatment composition which can impart excellent water- and oil-repellency and soil resistance to a substrate such as a textile.

Means for Solving the Problems

The present invention provides a composition comprising:
(A) a fluorine-containing urethane compound, and
(B) a fluorine-containing polymer comprising repeating units derived from a fluorine-containing monomer of the formula:

$$CH_2=C(-X)-C(=O)-A-Rf \quad (I)$$

wherein X is a fluorine atom, a chlorine atom, a bromine atom, an iodine atom, a $CFX^1X^2$ group (in which $X^1$ and $X^2$ respectively represent a hydrogen atom, a fluorine atom or a chlorine atom), a cyano group, a linear or branched fluoroalkyl group having 1 to 20 carbon atoms, a substituted or unsubstituted benzyl group, or a substituted or unsubstituted phenyl group;

A is $-O-Y^1-$ (in which $Y^1$ is an aliphatic group having 1 to 10 carbon atoms, an aromatic or cycloaliphatic group having 6 to 10 carbon atoms, a $-CH_2CH_2N(R^1)SO_2-(CH_2CH_2)_a-$ group (in which $R^1$ is an alkyl group having 1 to 4 carbon atoms, and a is 0 or 1.) or a $-CH_2CH(OR^{11})CH_2-$ group (in which $R^{11}$ is a hydrogen atom or an acetyl group.)), or
$-Y^2-[-(CH_2)_m-Z-]_p-(CH_2)_n-$ (in which $Y^2$ is $-O-$ or $-NH-$; Z is $-S-$ or $-SO_2-$; m is 1 to 10, n is 0 to 10, and p is 0 or 1.); and
Rf is a linear or branched perfluoroalkyl group having 1 to 6 carbon atoms.

EFFECTS OF THE INVENTION

The treatment composition of the present invention can give excellent water- and oil-repellency and soil resistance to a substrate.

MODE OF CARRYING OUT THE INVENTION

The treatment composition of the present invention comprises the fluorine-containing urethane compound (A) and the fluorine-containing polymer (B). The treatment composition may contain also (C) a silicon-containing compound in addition to the fluorine-containing urethane compound (A) and the fluorine-containing polymer (B). The treatment agent may contain a liquid medium (for example, water and/or an organic solvent) and optionally a surfactant.

The fluorine-containing urethane compound (A) is generally of the formula:

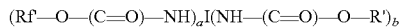

wherein each of Rf' is, the same or different, a monovalent organic group containing at least fluorine atom,
I is an organic group having (a+b)-valency remaining after all of isocyanate groups are removed from a polyisocyanate compound having (a+b) isocyanate groups,
each of R' is, the same or different, a monovalent organic group free of a fluorine atom,
a is an integer of 1 to 15, b is an integer of 0 to 14, and the total of a and b is an integer of 1 to 15.

In the fluorine-containing urethane compound (A), Rf' may be of the formula:

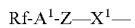

wherein Rf is a perfluoroalkyl group having 1 to 6 carbon atoms,
$A^1$ is a direct bond or a divalent organic group having 1 to 21 carbon atoms,
Z is a direct bond, $-S-$ or $-SO_2-$, and
$X^1$ is a direct bond, a divalent linear or branched aliphatic group having 1 to 5 carbon atoms optionally having at least one hydroxyl group.

In the fluorine-containing urethane compound (A), examples of Rf are of the formulas:

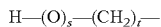

wherein s is 0 or 1, and t is the number of 1 to 5,

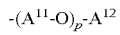

wherein $A^{11}$ is an alkyl group having 2 to 5 carbon atoms, $A^{12}$ is a hydrogen atom or an alkyl group having 1 to 5 carbon atoms, and p is 0 to 20, and

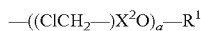

wherein $X^2$ is a trivalent linear or branched aliphatic group having 2 to 5 carbon atoms, $R^1$ is a hydrogen atom or an alkyl group having 1 to 10 carbon atoms, and a is the number of 1 to 20.

The fluorine-containing urethane compound (A) may be, for example, of the formula:

$$[Rf-A^1-Z-X^1-OC(=O)NH-]_m I[-NHC(=O)O-Y^1]_n[-NHC(=O)O-((ClCH_2-)X^2O)_a-R^1]_k \quad (1)$$

wherein I is a group remaining after an isocyanate group is removed from a polyisocyanate compound, Rf is a perfluoroalkyl group having 1 to 6 carbon atoms, $A^1$ is a direct bond or a divalent organic group having 1 to 21 carbon atoms, Z is a direct bond, —S— or —SO$_2$—, $X^1$ is a direct bond, a divalent linear or branched aliphatic group having 1 to 5 carbon atoms optionally having at least one hydroxyl group, $X^2$ is a trivalent linear or branched aliphatic group having 2 to 5 carbon atoms, $Y^1$ is a monovalent organic group optionally having a hydroxyl group, $R^1$ is a hydrogen atom or an alkyl group having 1 to 10 carbon atoms, a is the number of 1 to 20, m is the number of 1 to 15, n and k are the number of 0 to 14, and the total of m, n and k is the number of 2 to 15.

In the formula (1), I is a group remaining after the isocyanate group is removed from the polyisocyanate compound. The polyisocyanate compound is a compound having at least two isocyanate groups. The polyisocyanate compound may be an aliphatic polyisocyanate, an aromatic polyisocyanate, or derivatives of these polyisocyanates.

Examples of the aliphatic polyisocyanate, particularly an aliphatic diisocyanate are hexamethylene diisocyanate, isophorone diisocyanate, xylylene diisocyanate, hydrogenated xylylene diisocyanate, and hydrogenated dicyclohexylmethane diisocyanate. Examples of the aromatic polyisocyanate, particularly an aromatic diisocyanate are tolylene diisocyanate, diphenylmethane diisocyanate (MDI), tolidine diisocyanate and naphthalene diisocyanate.

The polyisocyanate compound is preferably a diisocyanate, a polymeric MDI (diphenylmethane diisocyanate), a modified isocyanate (particularly, a trimer of diisocyanate, or an adduct between a polyhydric alcohol and a diisocyanate).

Examples of the modified isocyanate are a urethane-modified diisocyanate, an allophanate-modified diisocyanate, a biuret-modified diisocyanate, an isocyanurate-modified diisocyanate, a carbodiimide-modified diisocyanate, a uretonimine-modified diisocyanate and an acylurea diisocyanate.

In the formula (1), the Rf group is a perfluoroalkyl group having 1 to 6 carbon atoms. The carbon number of the Rf group may be, for example, from 1 to 5, particularly from 1 to 4. Examples of the Rf group include —CF$_3$, —CF$_2$CF$_3$, —CF$_2$CF$_2$CF$_3$, —CF(CF$_3$)$_2$, —CF$_2$CF$_2$CF$_2$CF$_3$, —CF$_2$CF(CF$_3$)$_2$, —C(CF$_3$)$_3$, —(CF$_2$)$_4$CF$_3$, —(CF$_2$)$_2$CF(CF$_3$)$_2$, —CF$_2$C(CF$_3$)$_3$, —CF(CF$_3$)CF$_2$CF$_2$CF$_3$, —(CF$_2$)$_5$CF$_3$ and —(CF$_2$)$_3$CF(CF$_3$)$_2$.

In the formula (1), $A^1$ is a direct bond or a divalent organic group having 1 to 21 carbon atoms. The $A^1$ group may be, for example, of the formula:

—(CH$_2$)$_p$—

—CONR$^{11}$—R$^{12}$—

—CH$_2$C(OH)HCH$_2$—

—CH$_2$C(OCOR$^{13}$)HCH$_2$— or

—O—Ar—CH$_2$— wherein $R^{11}$ is hydrogen or an alkyl group having 1 to 10 carbon atoms, $R^{12}$ is an alkylene group having 1 to 10 carbon atoms, $R^{13}$ is hydrogen or a methyl group, Ar is an arylene group (having, for example, 6 to 20 carbon atoms) optionally having a substituent, and p is an integer of 1 to 10.

$A^1$ may be particularly an alkylene group having 1 to 5 carbon atoms.

$X^1$ is a direct bond, a $C_{1-5}$ divalent linear or branched aliphatic group, or a $C_{1-5}$ divalent linear or branched aliphatic group having at least one hydroxyl group. $X^1$ may be an alkylene group having no hydroxyl group, or an alkylene group having one, two or three hydroxyl group. Examples of $X^1$ are:

(i) an alkylene group selected from the group consisting of —CH$_2$—, —CH$_2$CH$_2$—, —CH$_2$CH$_2$CH$_2$—, —CH$_2$CH$_2$CH$_2$CH$_2$—, —CH$_2$CH$_2$CH$_2$CH$_2$CH$_2$—, —C(CH$_3$)H—, —C(CH$_3$)H—CH$_2$—, —CH$_2$—C(CH$_3$)H—, —CH$_2$—C(CH$_3$)H—CH$_2$—, —C(CH$_3$)H—CH$_2$—CH$_2$—, —C(CH$_3$)H—C(CH$_3$)H—, —CH$_2$—C(CH$_3$)$_2$—CH$_2$—, —C(CH$_3$)H—C(CH$_3$)H—CH$_2$— and —C(CH$_3$)H—CH$_2$—C(CH$_3$)H—, and (ii) an alkylene group having a hydroxyl group, selected from the group consisting of —C(OH)H—, —C(OH)HCH$_2$—, —CH$_2$C(OH)H—, —C(OH)HC(OH)H—, —C(OH)HCH$_2$CH$_2$—, —CH$_2$C(OH)HCH$_2$—, —CH$_2$CH$_2$C(OH)H—, —C(OH)HC(OH)HCH$_2$—, —C(OH)HCH$_2$C(OH)H—, —CH$_2$C(OH)HC(OH)H—, —CH$_2$C(OH)$_2$CH$_2$— and —C(OH)HC(OH)HC(OH)H—.

The -$A^1$-Z—$X^1$— group in the formula (1) acts as a spacer. Specific examples of the spacer include the followings:

—S—(CH$_2$)$_2$—

—S—(CH$_2$)$_3$—

—SO$_2$—(CH$_2$)$_2$—

—SO$_2$—(CH$_2$)$_3$—

—(CH$_2$)$_2$—S—(CH$_2$)$_2$—

—(CH$_2$)$_2$—S—(CH$_2$)$_3$—

—(CH$_2$)$_2$—SO$_2$—(CH$_2$)$_2$—

—(CH$_2$)$_2$—SO$_2$—(CH$_2$)$_3$—

—S—CH$_2$C(OH)HCH$_2$—

—SO$_2$—CH$_2$C(OH)HCH$_2$—

—(CH$_2$)$_2$—S—CH$_2$C(OH)HCH$_2$—

—(CH$_2$)$_2$—SO$_2$—CH$_2$C(OH)HCH$_2$—

$Y^1$ is a monovalent organic group optionally having a hydroxyl group. $Y^1$ is represented by, for example, the formula:

H—(O)$_s$—(CH$_2$)$_t$— wherein s is 0 or 1, and t is the number of 1 to 5. Examples of $Y^1$ are CH$_3$—, H(CH$_2$)$_2$—, H(CH$_2$)$_3$—, HO—CH$_2$—, HO—(CH$_2$)$_2$— and HO—(CH$_2$)$_3$—.

$Y^1$ is, for example, -(A$^{11}$-O)$_p$-A$^{12}$ (wherein A$^{11}$ is an alkyl group having 2 to 5 carbon atoms, A$^{12}$ is a hydrogen atom or an alkyl group having 1 to 5 carbon atoms, and p is from 0 to 20.). p may be from 1 to 15, for example, from 2 to 10.

$X^2$ is a trivalent linear or branched aliphatic group having 2 to 5 carbon atoms. Examples of $X^2$ are >CHCH$_2$—(—CH$_2$CH<), >CHCH$_2$CH$_2$—(—CH$_2$CH$_2$CH<), $$-\text{CH}_2\overset{|}{\text{CH}}\text{CH}_2-  \quad  -\text{CH}_2\overset{|}{\underset{\text{CH}_3}{\text{C}}}\text{CH}_2-$$

>CHCH$_2$CH$_2$CH$_2$—(—CH$_2$CH$_2$CH$_2$CH<), and

>CHCH$_2$CH$_2$CH$_2$CH$_2$—(—CH$_2$CH$_2$CH$_2$CH$_2$CH<).

$R^1$ is a hydrogen atom or an alkyl group having 1 to 10 carbon atoms. Examples of $R^1$ which is the alkyl group are methyl, ethyl and propyl.

"a" is the number of 1 to 20. "a" may be, for example, from 2 to 15, particularly from 2 to 10.

"m" is the number of 1 to 15. "m" may be, for example, from 2 to 10, particularly from 2 to 3.

"n" and "k" are the number of 0 to 14. "n" and "k" may be, for example, from 0 to 10, particularly from 1 to 8.

The total of m, n and k is the number of 2 to 15. The total of m, n and k may be, for example, from 2 to 10, particularly from 2 to 3.

The fluorine-containing urethane compound in the present invention may be of the formula:

[Rf-A$^1$-Z—X$^1$—OC(=O)NH—]$_m$I[—NHC(=O)O—Y$^1$]$_n$     (2)

wherein I is a group remaining after an isocyanate group is removed from a polyisocyanate compound, Rf is a perfluoroalkyl group having 1 to 21 carbon atoms, $A^1$ is a direct bond or a divalent organic group having 1 to 21 carbon atoms, Z is a direct bond, —S— or —SO$_2$—, $X^1$ is a direct bond, or a divalent linear or branched aliphatic group having 1 to 5 carbon atoms optionally having at least one hydroxyl group, $Y^1$ is a monovalent organic group optionally having a hydroxyl group, m is the number of 1 to 15, n is the number of 0 to 14, and the total of m and n is the number of 2 to 15; or

[Rf-A$^1$-Z—X$^1$—OC(=O)NH—]$_m$I     (3)

wherein I is a group remaining after an isocyanate group is removed from a polyisocyanate compound, Rf is a perfluoroalkyl group having 1 to 21 carbon atoms, $A^1$ is a direct bond or a divalent organic group having 1 to 21 carbon atoms, Z is a direct bond, —S— or —SO$_2$—, $X^1$ is a direct bond, or a divalent linear or branched aliphatic group having 1 to 5 carbon atoms optionally having at least one hydroxyl group, and m is the number of 2 to 15.

Specific examples of the fluorine-containing urethane compound (A) are as follows:

[Chemical Formula 1]

RfSCH$_2$CH$_2$CH$_2$OOCHN—(CH$_2$)$_6$—[isocyanurate ring]—(CH$_2$)$_6$—NHCOOCH$_2$CH$_2$CH$_2$SRf with RfSCH$_2$CH$_2$CH$_2$OOCHN—(CH$_2$)$_6$— as third substituent

[Chemical Formula 2]

RfSO$_2$CH$_2$CH$_2$CH$_2$OOCHN—(CH$_2$)$_6$—[isocyanurate ring]—(CH$_2$)$_6$—NHCOOCH$_2$CH$_2$CH$_2$SO$_2$Rf with RfSO$_2$CH$_2$CH$_2$CH$_2$OOCHN—(CH$_2$)$_6$— as third substituent

[Chemical Formula 3]

RfCH$_2$CH$_2$SO$_2$CH$_2$CH$_2$CH$_2$OOCHN—(CH$_2$)$_6$—[isocyanurate ring]—(CH$_2$)$_6$—NHCOOCH$_2$CH$_2$CH$_2$SO$_2$CH$_2$CH$_2$Rf with RfCH$_2$CH$_2$SO$_2$CH$_2$CH$_2$CH$_2$OOCHN—(CH$_2$)$_6$— as third substituent

[Chemical Formula 4]

RfCH$_2$CH$_2$SCH$_2$CH$_2$CH$_2$OOCHN—(CH$_2$)$_6$—[isocyanurate ring]—(CH$_2$)$_6$—NHCOOCH$_2$CH$_2$CH$_2$SCH$_2$CH$_2$Rf with RfCH$_2$CH$_2$SCH$_2$CH$_2$CH$_2$OOCHN—(CH$_2$)$_6$— as third substituent

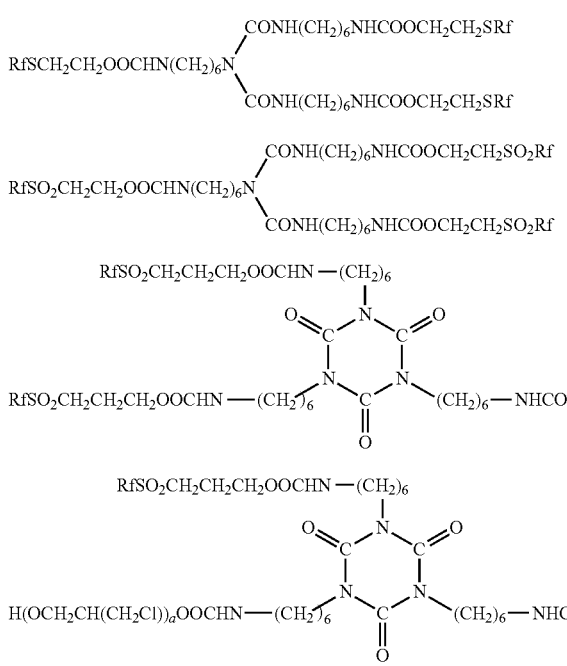

[Chemical Formula 5]

[Chemical Formula 6]

[Chemical Formula 7]

[Chemical Formula 8]

wherein Rf, $Y^1$ and a are the same as defined above.

The fluorine-containing urethane compound (A) in the present invention can be obtained, for example, by reacting a polyisocyanate compound with a fluorine-containing alcohol of the formula:

$$Rf-A^1-Z-X^1-OH \qquad (i)$$

and, optionally present, an alcohol of the formula:

$$HO-Y^1 \qquad (ii)$$

and a chlorine-containing ether alcohol of the formula:

$$HO-((ClCH_2-)X^2O)_b-R^1 \qquad (iii)$$

wherein Rf, $A^1$, Z, $X^1$, $X^2$, $Y^1$, $R^1$ and a are the same as defined above.

In this reaction, the total amount of the fluorine-containing alcohol (i), the alcohol (ii) and the chlorine-containing ether alcohol (iii) is preferably from 0.5 mol to 2.0 mol, particularly from 0.8 mol to 1.5 mol, based on 1 mol of isocyanate group in the polyisocyanate compound. The alcohol (ii) and the chlorine-containing ether alcohol (iii) are a component which may be used or may not be used. This reaction is preferably conducted in the presence of a solvent at 0° C. to 150° C. for 0.1 hours to 10 hours. The solvent is an organic solvent which is inert to the isocyanate. Examples of the solvent are a hydrocarbon, a ketone and a halogenated hydrocarbon (for example, a chlorine-containing hydrocarbon). The amount of the solvent may be from 20 to 500 parts by weight, for example, from 100 to 300 parts by weight, based on 100 parts by weight of the reactants.

A catalyst is preferably used in the reaction. Examples of the catalyst are an amine (for example, a monoamine, a diamine, a triamine, an alcohol amine, and an ether amine), and an organic metal (for example, a metal salt of an organic acid such as di-n-butyl tin dilaurate). The amount of the catalyst may be from 0.001 to 0.5 parts by weight, for example, from 0.01 to 0.3 parts by weight, based on 100 parts by weight of the reactants.

The fluorine-containing alcohol (i) (a compound wherein Z is —S—) can be obtained by, for example, reacting Rf-$A^1$-I (iodide) with HS—$X^1$—OH. The fluorine-containing alcohol (i) wherein Z is —$SO_2$— can be obtained by oxidizing, with a peroxide and the like, —S— in the fluorine-containing alcohol (i) wherein Z is —S— to convert —S— to —$SO_2$—.

The alcohol (ii) may be a monohydric alcohol or a polyhydric (for example, di- to penta-hydric) alcohol. Examples of the alcohol (ii) are an aliphatic alcohol and an aromatic alcohol. Specific examples of the alcohol (ii) are ethanol, propanol, ditripropylene glycol, trimethylol propane, pentaerythritol, phenol and hyrdoxytoluene.

The chlorine-containing ether alcohol (iii) can be obtained, for example, by polymerizing a chlorine-containing ether compound of the formula:

[Chemical Formula 9]

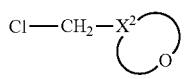

wherein $X^2$ is the same as defined above. Examples of the chlorine-containing ether compound include epichlorohydrin.

The fluorine-containing urethane compound (A) may be a mixture in the form of a solution or an emulsion immediately after the production thereof.

The solution-type mixture comprises the fluorine-containing urethane compound and a solvent. Examples of the solvent (particularly, an organic solvent) in the solution-type mixture are a hydrocarbon, a ketone, and a halogenated hydrocarbon (for example, a chloride-containing hydrocarbon) and an alcohol (for example, glycol). Specific examples of the organic solvent include acetone, chloroform, HCHC225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, ethyl acetate, butyl acetate, 1,1,2,2-tetrachloroethane, 1,1,1-trichloroethane, trichloroethylene, perchloroethylene, tetrachlorodifluoroethane and trichlorotrifluoroethane.

The emulsion-type mixture comprises a fluorine-containing urethane compound, an emulsifier and water. The emulsion-type mixture may further contain a water-soluble organic solvent, particularly a water-soluble organic solvent dissolving the fluorine-containing urethane compound. Examples of the water-soluble organic solvent include acetone, methyl ethyl ketone, ethyl acetate, propylene glycol, dipropylene glycol monomethyl ether, dipropylene glycol, tripropylene glycol and ethanol. The water-soluble organic solvent may be used in the amount within the range from 1 to 50 parts by weight, e.g., from 10 to 40 parts by weight, based on 100 parts by weight of water. The emulsifier may be any of nonionic and ionic (for example, cationic, anionic and amphoteric).

The amount of the fluorine-containing urethane compound may be from 0.1 to 70% by weight, for example, from 5 to 30% by weight, based on the mixture. In the emulsion-type mixture, relative to 100 parts by weight of the fluorine-containing urethane compound, the amount of the emulsifier may be from 0.1 to 30 parts by weight, for example, from 2 to 10 parts by weight, the amount of water may be from 30 to 95 parts by weight, for example, from 70 to 95 parts by weight, and the amount of the organic solvent may be from 0 to 200 parts by weight, particularly from 10 to 200 parts by weight, for example, from 50 to 100 parts by weight.

The composition of the present invention contains the fluorine-containing polymer (B). The fluorine-containing polymer (B) comprises repeating units derived from (B-1) a fluorine-containing monomer of the formula:

$$CH_2=C(-X)-C(=O)-A-Rf \qquad (I)$$

wherein X is a fluorine atom, a chlorine atom, a bromine atom, an iodine atom, a $CFX^1X^2$ group (in which $X^1$ and $X^2$ respectively represent a hydrogen atom, a fluorine atom or a chlorine atom), a cyano group, a linear or branched fluoroalkyl group having 1 to 20 carbon atoms, a substituted or unsubstituted benzyl group, or a substituted or unsubstituted phenyl group;

A is $-O-Y^1-$ (in which $Y^1$ is an aliphatic group having 1 to 10 carbon atoms, an aromatic or cycloaliphatic group having 6 to 10 carbon atoms, a $-CH_2CH_2N(R^1)SO_2-(CH_2CH_2)_a-$ group (in which $R^1$ is an alkyl group having 1 to 4 carbon atoms, and a is 0 or 1.) or a $-CH_2CH(OR^{11})CH_2-$ group (in which $R^{11}$ is a hydrogen atom or an acetyl group.)), or
$-Y^2-[-(CH_2)_m-Z-]_p-(CH_2)_n-$ (in which $Y^2$ is $-O-$ or $-NH-$; Z is $-S-$ or $-SO_2-$; m is 1 to 10, n is 0 to 10, and p is 0 or 1.), Rf is a linear or branched perfluoroalkyl group having 1 to 6 carbon atoms.

The fluorine-containing polymer (B) may contain repeating units derived from (B-2) a monomer free from a fluorine atom.

The fluorine-containing polymer (B) may be a fluorine-containing polymer comprising:
the above-mentioned repeating units (B-1),
(B-2) repeating units derived from a monomer free from a fluorine atom.
(B-3) optionally present, repeating units derived from a crosslinkable monomer.

The fluorine-containing polymer (B) may be a copolymer comprising (a) the fluorine-containing monomer of the formula (I) wherein the alpha-position is replaced with an X group, (b) a monomer free from a fluorine atom, and (c) a crosslinkable monomer.

The repeating unit (B-1) is derived from the fluorine-containing monomer (a) of the formula (I). In the formula (I), the Rf group is preferably a perfluoroalkyl group. The carbon number of the Rf group is from 1 to 6, for example, from 1 to 5, particularly from 1 to 4.

A is $-O-Y^1-$ (in which $Y^1$ is an aliphatic group having 1 to 10 carbon atoms, an aromatic or cycloaliphatic group having 6 to 10 carbon atoms, a $-CH_2CH_2N(R^1)SO_2-(CH_2CH_2)_a-$ group (in which $R^1$ is an alkyl group having 1 to 4 carbon atoms, and a is 0 or 1.) or a $-CH_2CH(OR^{11})CH_2-$ group (in which $R^{11}$ is a hydrogen atom or an acetyl group.)), or $-Y^2-[-(CH_2)_m-Z-]_p-(CH_2)_n-$ (in which $Y^2$ is $-O-$ or $-NH-$; Z is $-S-$ or $-SO_2-$; m is 1 to 10, n is 0 to 10, and p is 0 or 1.). The aliphatic group is preferably an alkylene group (particularly carbon number of 1 to 4, for example, 1 or 2). The aromatic group and cycloaliphatic group may be substituted or may not be substituted. m and n are preferably 2 or 3.

Examples of the fluorine-containing monomer (a) are as follows:

[Chemical formula 10]

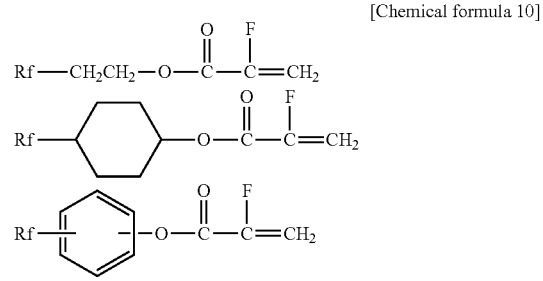

[Chemical formula 11]

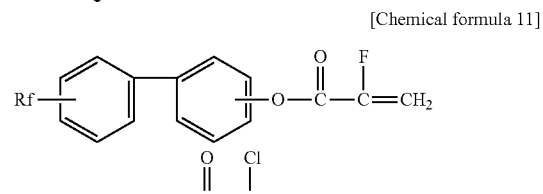

[Chemical formula 12]

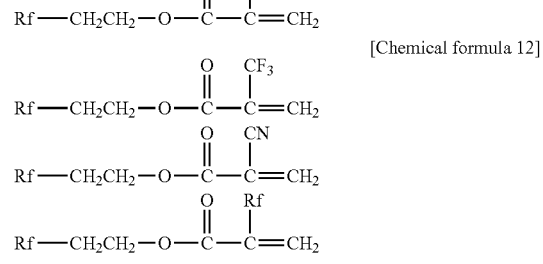

[Chemical formula 13]

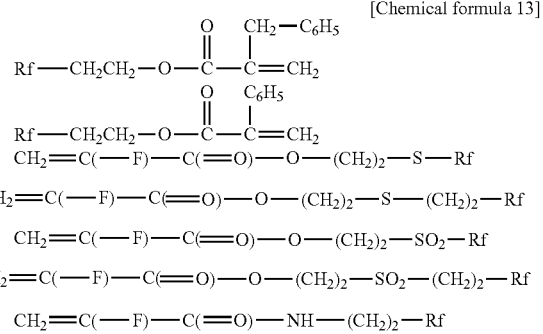

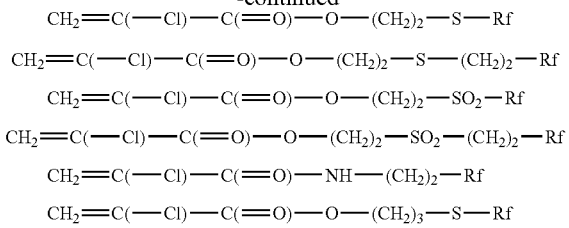

wherein Rf is a linear or branched fluoroalkyl group having 1 to 6 carbon atoms.

The repeating units (B-2) are derived from (b) the monomer free from a fluorine atom. The monomer (b) is preferably a fluorine-free monomer having a carbon-carbon double bond. The monomer (b) is preferably a vinyl monomer which is free from fluorine. The fluorine atom-free monomer (b) is generally a compound having one carbon-carbon double bond. Preferable examples of the fluorine atom-free monomer (b) include, for example, ethylene, vinyl acetate, vinyl halide (for example, vinyl chloride) vinylidene halide (for example, vinylidene chloride), acrylonitrile, styrene, polyethyleneglycol(meth)acrylate, polypropyleneglycol(meth)acrylate, methoxypolyethyleneglycol(meth)acrylate, methoxypolypropyleneglycol(meth)acrylate, vinyl alkyl ether and isoprene. The fluorine atom-free monomer (b) is not limited to these examples. The monomer (b) may be a mixture between a (meth)acrylate monomer and a monomer other the (meth)acrylate monomer. The weight ratio of the (meth)acrylate monomer and the monomer other the (meth)acrylate monomer may be, for example, from 5:95 to 95 to 5, particularly from 70:30 to 30:70.

The fluorine atom-free monomer (b) may be a (meth)acrylate ester having an alkyl group. The number of carbon atoms of the alkyl group may be from 1 to 30, for example, from 6 to 30, e.g., from 10 to 30. For example, the fluorine atom-free monomer (b) may be acrylates of the general formula:

wherein $A^1$ is a hydrogen atom or a methyl group, and $A^2$ is an alkyl group represented by $-C_nH_{2n+1}$ (n=1 to 30) or an alkoxide group represented by $-(A^{11}-O)_p-A^{12}$ (in which $A^{11}$ is an alkyl group having 2 to 5 carbon atoms, $A^{12}$ is a hydrogen atom or an alkyl group having 1 to 5 carbon atoms, and p is from 1 to 20.).

The repeating units (B-3) are derived from the crosslinkable monomer (c). The crosslinkable monomer (c) may be a fluorine-free monomer having at least two reactive groups and/or carbon-carbon double bonds. The crosslinkable monomer (c) may be a compound having at least two carbon-carbon double bonds, or a compound having at least one carbon-carbon double bond and at least one reactive group. Examples of the reactive group include a hydroxyl group, an epoxy group, a chloromethyl group, a blocked isocyanate group, an amino group and a carboxyl group.

Examples of the crosslinkable monomer (c) include diacetoneacrylamide, (meth)acrylamide, N-methylolacrylamide, hydroxymethyl(meth)acrylate, hydroxyethyl(meth)acrylate, 3-chloro-2-hydroxypropyl(meth)acrylate, N,N-dimethylaminoethyl(meth)acrylate, N,N-diethylaminoethyl(meth)acrylate, butadiene, chloroprene and glycidyl(meth)acrylate, to which the crosslinkable monomer is not limited.

The copolymerization with the monomer (b) and/or the monomer (c) can optionally improve various properties such as water- and oil-repellency and soil resistance; cleaning durability and washing durability of said repellency and resistance; solubility in solvent; hardness; and feeling.

In the fluorine-containing polymer, the amount of the fluorine atom-free monomer (b) may be from 0 to 200 parts by weight, for example, from 0.1 to 100 parts by weight, particularly from 0.1 to 50 parts by weight, and the amount of the crosslinkable monomer (c) may be from 0 to 50 parts by weight, for example, from 0 to 20 parts by weight, particularly, from 0.1 to 15 parts by weight, based on 100 parts by weight of the fluorine-containing monomer (a).

The weight-average molecular weight of the fluorine-containing polymer may be from 5,000 to 2,000,000, for example, from 10,000 to 1,000,000, which can be measured by gel permeation chromatography (GPC).

The fluorine-containing polymer can be produced as follows:

In a solution polymerization, there can be used a method of dissolving the monomer(s) into an organic solvent in the presence of a polymerization initiator, replacing the atmosphere by nitrogen, and stirring the mixture with heating at the temperature within the range from 30° C. to 120° C. for 1 hour to 10 hours. Examples of the polymerization initiator include azobisisobutyronitrile, benzoyl peroxide, di-tert-butyl peroxide, lauryl peroxide, cumene hydroperoxide, t-butyl peroxypivalate and diisopropyl peroxydicarbonate. The polymerization initiator may be used in the amount within the range from 0.01 to 20 parts by weight, for example, from 0.01 to 10 parts by weight, based on 100 parts by weight of total of the monomers.

The organic solvent is inert to the monomer(s) and dissolves the monomer(s), and examples thereof include acetone, chloroform, HCHC225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, ethyl acetate, butyl acetate, 1,1,2,2-tetrachloroethane, 1,1,1-trichloroethane, trichloroethylene, perchloroethylene, tetrachlorodifluoroethane and trichlorotrifluoroethane. The organic solvent may be used in the amount within the range from 50 to 2,000 parts by weight, for example, from 50 to 1,000 parts by weight, based on 100 parts by weight of total of the monomers.

In an emulsion polymerization, there can be used a method of emulsifying monomers in water in the presence of a polymerization initiator and an emulsifying agent, replacing the atmosphere by nitrogen, and polymerizing with stirring, for example, at the temperature within the range from 50° C. to 80° C. for 1 hour to 10 hours. As the polymerization initiator, for example, water-soluble initiators (e.g., benzoyl peroxide, lauroyl peroxide, t-butyl perbenzoate, 1-hydroxycyclohexyl hydroperoxide, 3-carboxypropionyl peroxide, acetyl peroxide, azobisisobutylamidine dihydrochloride, azobisisobutyronitrile, sodium peroxide, potassium persulfate and ammonium persulfate) and oil-soluble initiators (e.g., azobisisobutyronitrile, benzoyl peroxide, di-tert-butyl peroxide, lauryl peroxide, cumene hydroperoxide, t-butyl peroxypivalate and diisopropyl peroxydicarbonate) are used. The polymerization initiator may be used in the amount within the range from 0.01 to 10 parts by weight based on 100 parts by weight of the monomers.

In order to obtain a polymer dispersion in water, which is superior in storage stability, it is desirable that the monomers are dispersed in water by using an emulsifying device capable of applying a strong shearing energy (e.g., a high-pressure homogenizer and an ultrasonic homogenizer) and then polymerized with using the oil-soluble polymerization initiator. As the emulsifying agent, various emulsifying agents such as an anionic emulsifying agent, a cationic emulsifying agent and a nonionic emulsifying agent can be used in the amount within the range from 0.5 to 20 parts by weight based on 100 parts by weight of the monomers. An anionic and/or cationic and/or nonionic emulsifying agent is preferably used. When the monomers are not completely compatibilized, a compatibilizing agent (e.g., a water-soluble organic solvent and a low-molecular weight monomer) capable of sufficiently compatibilizing them is preferably added to these monomers. By the addition of the compatibilizing agent, the emulsifiability and copolymerizability can be improved.

Examples of the water-soluble organic solvent include acetone, methyl ethyl ketone, ethyl acetate, propylene glycol, dipropylene glycol monomethyl ether, dipropylene glycol, tripropylene glycol and ethanol. The water-soluble organic solvent may be used in the amount within the range from 1 to 50 parts by weight, e.g., from 10 to 40 parts by weight, based on 100 parts by weight of water. Examples of the low-molecular weight monomer include methyl methacrylate, glycidyl methacrylate and 2,2,2-trifluoroethyl methacrylate. The low-molecular weight monomer may be used in the amount within the range from 1 to 50 parts by weight, e.g., from 10 to 40 parts by weight, based on 100 parts by weight of total of monomers.

The mixture containing the fluorine-containing polymer (B) is preferably in the form of a solution, an emulsion or an aerosol. The mixture generally comprises the fluorine-containing polymer and a medium (for example, a liquid medium such as an organic solvent and water). The concentration of the fluorine-containing polymer (B) in the mixture may be, for example, from 0.1 to 70% by weight.

The composition of the present invention may contain also (C) a silicon-containing compound.

Examples of the silicon-containing compound (C) are a silicone oil, a modified silicone and a silicone resin.

Examples of the silicon-containing compound (C) are as follows:

Silicone Oil

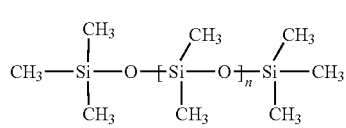
[Chemical formula 14]

wherein n is from 1 to 100000.

Modified Silicone

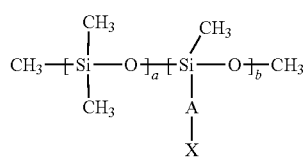
[Chemical formula 15]

wherein A is a direct bond or an alkyl group having 1 to 20 carbon atoms, X is an epoxy group, an amine group, a carboxyl group, an aryl group or a hydroxyl group, a and b are an integer of from 1 to 100000.

Silicone Resin

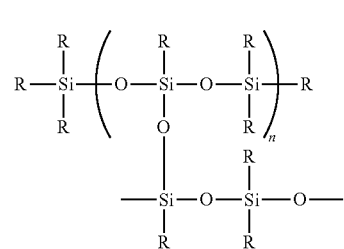
[Chemical formula 16]

wherein R is an aliphatic hydrocarbon group (for example, methyl group), or an aromatic hydrocarbon group (for example, an aryl group), and n is an integer of 1 to 100000.

The amount of the silicon-containing compound (C) may be, for example, from 0 to 20 parts by weight, particularly from 1 to 5 parts by weight, based on 100 parts by weight of the total of the fluorine-containing urethane compound (A) and the fluorine-containing polymer (B).

The composition of the present invention is preferably in the form of a solution, an emulsion or an aerosol. The composition generally comprises a liquid medium (for example, an organic solvent and water). The composition may contain an emulsifier (generally in the amount of 0.5 to 30 parts by weight, based on 100 parts by weight of the total of the fluorine-containing urethane compound (A), the fluorine-containing polymer (B) and, optionally, the silicon-containing compound (C)).

The composition of the present invention can be obtained by mixing the mixture comprising the fluorine-containing urethane compound (A) and the liquid medium (for example, an organic solvent and water), with the mixture comprising the fluorine-containing polymer (B) and the liquid medium (for example, an organic solvent and water). Before mixing, the heating (for example, at 40 to 90° C. for 1 to 120 minutes) may be optionally conducted. In the case that the composition is an emulsion, optionally, the composition may be emulsified by an emulsifying machine, and/or the emulsifying agent may be added to the composition, after the mixing. In the composition, the weight ratio of the fluorine-containing urethane compound (A) to the fluorine-containing polymer (B) may be from 95:5 to 5:95, particularly from 90:10 to 30:70, especially from 85:15 to 40:60, for example, from 80:20 to 50:50. In the composition, the concentration of the total of the fluorine-containing urethane compound (A), the fluorine-containing polymer (B) and optionally the silicon-containing compound (C) may be, for example, from 0.05 to 70% by weight. In the liquid medium, the weight ratio of the organic solvent to water may be from 0:100 to 100:0, for example, from 5:95 to 95:5.

The treatment composition of the present invention can be applied by a know procedure to a substrate to be treated. Usually, the treatment agent is diluted or dispersed with an organic solvent or water, is adhered to surfaces of the substrate by a well-known procedure such as an immersion coating, a spray coating and a foam coating, and is dried. If necessary, the treatment agent is applied together with a suitable crosslinking agent, followed by curing. It is also possible to add other treatment agents (for example, a water repellent agent and an oil repellent agent), or mothproofing agents, softeners, antimicrobial agents, flame retardants, antistatic agents, paint fixing agents, crease-proofing agents, etc. to the treatment agent of the present invention. For the immersion coating, the concentration of the total of the fluorine-containing urethane compound and the fluorine-containing polymer in an immersion treatment liquid may be from 0.05 to 10% by weight, based on the treatment liquid. For the spray coating, the concentration of the total of the fluorine-containing urethane compound and the fluorine-containing polymer in the treatment liquid may be from 0.1 to 5% by weight, based on the treatment liquid. A stain blocker may be used together. When the stain blocker is used, it is preferable to use an anionic emulsifier or a nonionic surfactant.

The substrate to be treated with the treatment composition (for example, a surface treatment agent such as a water- and oil-repellent agent) of the present invention include a textile (for example, a carpet and a non-woven fabric), masonry, a filter (for example, an electrostatic filter), a dust protective mask, a part of fuel cell (for example, a gaseous diffusion electrode and a gaseous diffusion support), glass, paper, wood, leather, fur, asbestos, brick, cement, metal and oxide, ceramics, plastics, a coated surface and a plaster. The textile may be particularly a carpet. The textile has various examples. Examples of the textile include animal- or vegetable-origin natural fibers such as cotton, hemp, wool and silk; synthetic fibers such as polyamide, polyester, polyvinyl alcohol, polyacrylonitrile, polyvinyl chloride and polypropylene; semi-synthetic fibers such as rayon and acetate; inorganic fibers such as glass fiber, carbon fiber and asbestos fiber; and a mixture of these fibers. The treatment agent of the present invention can be suitably used for carpet made from nylon and/or polypropylene, since it has excellent brushing resistance (mechanical).

The textile may be in any form such as a fiber, a yarn and a fabric. When the carpet is treated with the treatment composition of the present invention, the carpet may be formed after treating fibers or yarns with the treatment composition, or the formed carpet may be treated with the treatment composition. The fluorine-containing urethane compound (A) rapidly melts at a temperature (for example, about 80 to 100° C.) slightly smaller than a textile treatment temperature (generally 90 to 130° C.) to form a more homogeneous coating film on the textile, thereby giving excellent soil resistance.

The textile can be subjected to a treatment method (Exhaust process), comprising steps of:
(1) preparing a treatment liquid comprising a treatment agent and having pH of at most 7,
(2) applying the treatment liquid to the textile,
(3) treating the textile with steam, and
(4) washing the textile with water and dehydrating the textile.

EXAMPLES

The following Examples are specifically illustrated but are not to be construed to limit the scope of the invention.

Water-repellency Test

A treated carpet is stored in a thermo-hygrostat having a temperature of 21° C. and a humidity of 65% for at least 4 hours. A test liquid (isopropyl alcohol (IPA), water, and a mixture thereof, as shown in Table 1) which has been also stored at 21° C. is used. The test is conducted in an air-conditioned room having a temperature of 21° C. and a humidity of 65%. Five droplets (each in an amount of 0.05 μL) of the test liquid are softly dropped on the carpet by a micropipette. If 4 or 5 droplets remain on the carpet after standing for 10 seconds, the test liquid passes the test. The water-repellency is expressed by a point corresponding to a maximum content (% by volume) of isopropyl alcohol (IPA) in the test liquid which passes the test. The water-repellency is evaluated as twelve levels which are Fail, 0, 1, 2, 3, 4, 5, 6, 7, 8, 9 and 10 in order of a poor level to an excellent level.

TABLE 1

Water-repellency test liquid (% by volume)

| Point | Isopropyl alcohol | Water |
|---|---|---|
| 10 | 100 | 0 |
| 9 | 90 | 10 |
| 8 | 80 | 20 |
| 7 | 70 | 30 |
| 6 | 60 | 40 |
| 5 | 50 | 50 |
| 4 | 40 | 60 |
| 3 | 30 | 70 |
| 2 | 20 | 80 |
| 1 | 10 | 90 |
| 0 | 0 | 100 |
| Fail | Inferior to isopropyl alcohol 0/water 100 | |

Oil-repellency Test

A treated carpet is stored in a thermo-hygrostat having a temperature of 21° C. and a humidity of 65% for at least 4 hours. A test liquid (shown in Table 2) which has been also stored at 21° C. is used. The test is conducted in an air-conditioned room having a temperature of 21° C. and a humidity of 65%. Five droplets (each in an amount of 0.05 μL) of the test liquid are softly dropped on the carpet by a micropipette. If 4 or 5 droplets remain on the carpet after standing for 30 seconds, the test liquid passes the test. The oil-repellency is expressed by a maximum point of the test liquid which passes the test. The oil-repellency is evaluated as nine levels which are Fail, 1, 2, 3, 4, 5, 6, 7 and 8 in order of a poor level to an excellent level.

TABLE 2

Oil-repellency test liquid

| Point | Test liquid | Surface tension (dyne/cm, 25° C.) |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | Mixture liquid of n-Hexadecane 35/nujol 65 | 29.6 |
| 1 | Nujol | 31.2 |
| Fail | Inferior to 1 | — |

Soil Resistance Test

The soil resistance test is conducted according to AATCC Test Method 123-1989. The soil resistance is evaluated by comparing carpet samples before and after the soil resistance test by a Gray Scale for discoloration to classify 9 levels of 1, 1-2, 2, 2-3, 3, 3-4, 4, 4-5 and 5 in order of a significant discoloration level to no discoloration level.

Fluorine-containing compounds were synthesized as follows.

Synthetic Example 1

Synthesis of 3-(perfluorobutylthio)propanol

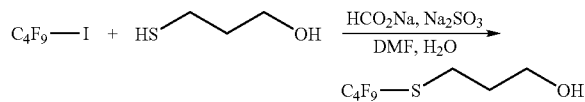

1,1,1,2,2,3,3,4,4-Nonafluoro-4-iodobutane (34.6 g, 100 mmol) was dissolved in a mixture liquid of dimethylformamide (DMF) (100 ml) and water (20 ml), and mercaptopropanol (9.2 g, 100 mmol) was added. Further, sodium formate (6.8 g, 100 mmol), and sodium sulfite heptahydrate (25.2 g, 100 mmol) were added and the mixture was stirred at room temperature for one night.

Water (250 mL) and isopropyl ether (250mL) were added to the reaction liquid and then the mixture having two layers was separated. An aqueous layer was further extracted with isopropyl ether (100 ml×2). An organic layer was washed with 10% hydrochloric acid (125 ml), water (125 ml) and saturated saline solution (125 ml), then dried over anhydrous magnesium sulfate, filtered and distilled for solvent removal. A concentrate (3-(perfluorobutylthio)propanol) (31.0 g) was obtained. Yield: 100%.

$^1$H NMR (CDCl$_3$; Internal standard TMS δ ppm): 3.78 (t, 2H, $J_{H H}$=5.9 Hz, CH$_2$OH), 3.09 (t, 2H, $J_{H H}$=7.1 Hz, SCH$_2$), 1.96 (tt, 2H, $J_{H H}$=7.1 Hz, $J_{H H}$=5.9 Hz, CH$_2$CH$_2$CH$_2$)

$^{19}$F NMR (CDCl$_3$; Internal standard CFCl$_3$ δ ppm): −81.5 (m, 3F, CF$_3$), −88.2 (m, 2F, CF$_2$S), −121.3 (m, 2F, CF$_2$), −126.0 (m, 2F, CF$_2$)

Synthetic Example 2

Synthesis of 3-(perfluorobutylsulfonyl)propanol

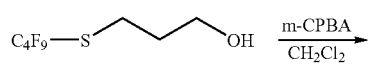

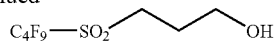

3-(Perfluorobutylthio)propanol (8.60 g, 27.6 mmol) prepared in Synthetic Example 1 was dissolved in methylene chloride (80 ml), and m-chloroperbenzoic acid (m-CPBA) (52 g, 232 mmol) was added at room temperature in two portions with stirring, the reaction vessel being equipped with a calcium chloride tube. The mixture was stirred at room temperature for 7 days. The reaction mixture was injected into a mixture of sodium thiosulfate pentahydrate (130 g) and water (200 ml), and stirred for 1 hour. Methylene chloride (100 mL) was added and an organic layer was removed and an aqueous layer was extracted with methylene chloride (50 ml). Organic layers were joined, washed with a 5% aqueous sodium hydrogen carbonate and with a saturated saline solution, and then dried over sodium sulfate. A filtrate after filtration was concentrated under reduced pressure. A residue was subjected to a silica gel column chromatography (eluting solvent:hexane-ethyl acetate (2/1)), and fractions having $R_f$ value of 0.32 [$R_f$ value (Thin Layer Chromatography (TLC))=(Migration distance of sample)/(Migration distance of eluting solvent)] were gathered, concentrated under reduced pressure and dried under vacuum to give crystalline 3-(perfluorobutylsulfonyl)propanol (8.79 g). Yield: 91.8%.

$^1$H NMR (CDCl$_3$; Internal standard TMS δ ppm): 3.85 (t, 2H, $J_{H H}$=5.8 Hz, CH$_2$OH), 3.47 (t, 2H, $J_{H H}$=7.6 Hz, SO$_2$CH$_2$), 2.22 (tt, 2H, $J_{H H}$=7.6 Hz, $J_{H H}$=5.8 Hz, CH$_2$CH$_2$CH$_2$)

$^{19}$F NMR (CDCl$_3$; Internal standard CFCl$_3$ δ ppm): −81.2 (m, 3F, CF$_3$), −113.8 (m, 2F, CF$_2$SO$_2$), −121.8 (m, 2F, CF$_2$), −126.3 (m, 2F, CF$_2$)

Preparative Example 1

Synthesis of 1,3,5-tris[6-{3-(perfluorobutylsulfonyl)propyl carbamate}hexyl]-1,3,5-triazinan-2,4,6-trione

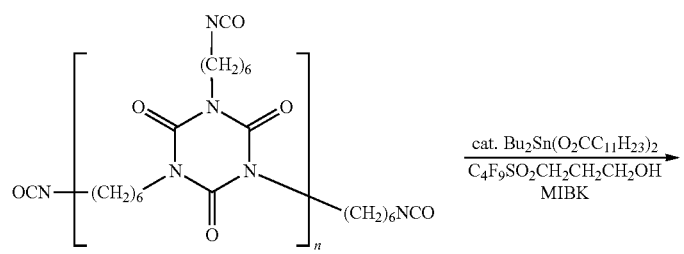

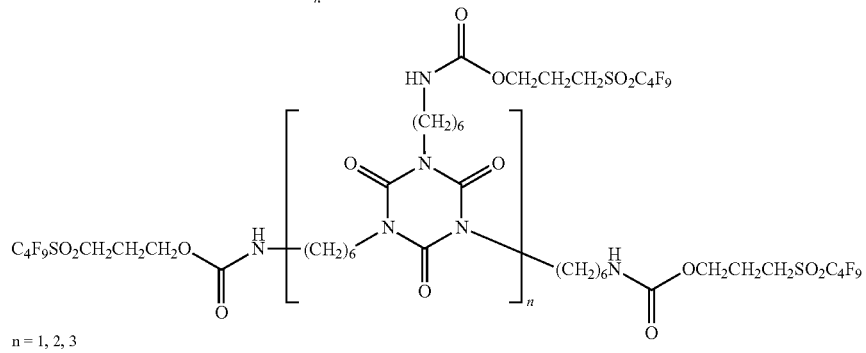

(a mixture of compounds wherein m is 1, 2 and 3 in a weight ratio of 55:20:25)

3-(Perfluorobutylsulfonyl)propanol (8.79 g, 25.7 mmol) prepared in Synthetic Example 2 was dissolved in methyl isobutyl ketone (MIBK) (27 ml), and dibutyl tin laurate (8 mg, 0.013 mmol) was added. While the content in the reaction vessel was adjusted to the temperature of 72 to 75° C. under equipment with a calcium chloride tube, a solution of SUMI-DUR N3300 (4.95 g, NCO equivalent of 25.8 mmol) in methyl isobutyl ketone (9 ml) was dropwise added for 1.5 hours. After the dropwise addition, the mixture was stirred at 75° C. for 1 hour and the solvent was removed off under reduced pressure. Hexane was added to a residue and then a precipitated crystal was collected and vacuum dried to give a white powdery crystal (Fluorine-containing urethane compound) (13.7 g). Yield: 100%.

$^1$H NMR (CD$_3$COCD$_3$; Internal standard TMS δ ppm): 6.35 (broad s, 3H, NHCO), 4.20 (t, 6H, $J_{H\,H}$=6.1 Hz, CH$_2$O×3), 3.84 (t, 6H, $J_{H\,H}$=7.3 Hz, CH$_2$NHCO×3), 3.70 (t, 6H, $J_{H\,H}$=7.8 Hz, SO$_2$CH$_2$×3), 3.12 (q, 6H, $J_{H\,H}$=6.6 Hz, CH$_2$N(CO)$_2$×3), 2.25 (tt, 6H, $J_{HH}$=7.8 Hz, $J_{HH}$=6.1 Hz, CH$_2$CH$_2$CH$_2$×3), 1.56 (m×2, 12H, CH$_2$×6), 1.36 (m, 12H, CH$_2$×6)
$^{19}$F NMR (CD$_3$COCD$_3$; Internal standard CFCl$_3$ δ ppm): −80.6 (m, 9F, CF$_3$×3), −113.2 (m, 6F, CF$_2$SO$_2$×3), −121.0 (m, 6F, CF$_2$×3), −125.6 (m, 6F, CF$_2$×3).

Preparative Example 2

Synthesis of 1,3,5-tris{6-(3,3,4,4,5,5,6,6,6-nonafluorohexylcarbamate)hexyl}-1,3,5-triazinan-2,4,6-trione

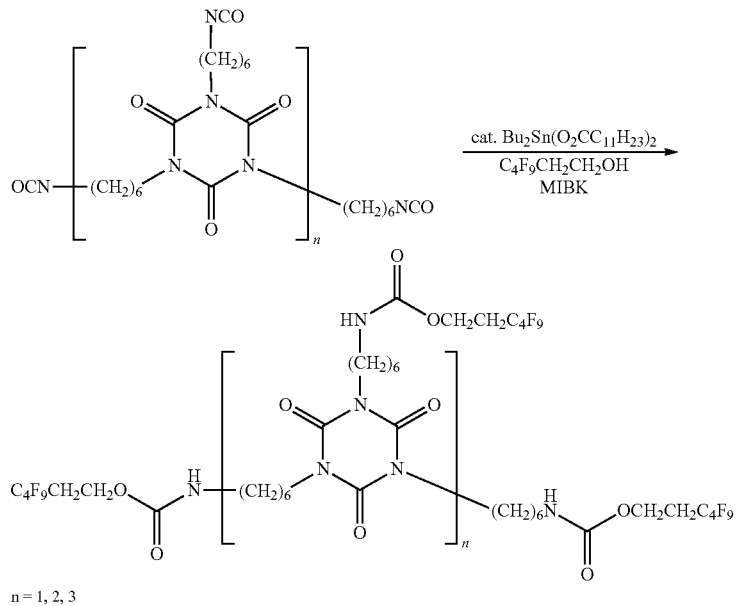

n = 1, 2, 3

Perfluorobutylethanol (26.4 g, 100 mmol) was dissolved in methyl isobutyl ketone (MIBK) (107 ml), and dibutyl tin laurate (32 mg, 0.051 mmol) was added. While the content in the reaction vessel was adjusted to the temperature of 72 to 75° C. under equipment with a calcium chloride tube, a solution of SUMIDUR N3300 (19.2 g, NCO equivalent of 100 mmol) in methyl isobutyl ketone (32 ml) was dropwise added for 3.5 hours. After the dropwise addition, the mixture was stirred at 75 to 76° C. for 2 hours and the solvent was removed under reduced pressure. The mixture was vacuum dried to give viscous white opaque liquid (45.6 g). Yield: 100%.

$^1$H NMR (CD$_3$COCD$_3$; Internal standard TMS δ ppm): 6.38 (broad s, 3H, NHCO), 4.33 (t, 6H, $J_{H\,H}$=6.2 Hz, CH$_2$O×3), 3.84 (t, 6H, $J_{H\,H}$=7.2 Hz, CH$_2$NHCO×3), 3.13 (q, 6H, $J_{H\,H}$=6.3 Hz, CH$_2$N(CO)$_2$×3), 2.6 (m, 6H, CH$_2$CF$_2$×3), 1.56 (m×2, 12H, CH$_2$×6), 1.36 (m, 12H, CH$_2$×6)
$^{19}$F NMR (CD$_3$COCD$_3$; Internal standard CFCl$_3$ δ ppm): −81.0 (m, 9F, CF$_3$×3), −113.3 (m, 6F, CF$_2$×3), −124.2 (m, 6F, CF$_2$×3), −125.7 (m, 6F, CF$_2$×3).

Preparative Example 3

C$_4$F$_9$CH$_2$CH$_2$OCOC(Cl)=CH$_2$ (150 g), stearyl acrylate (19.4 g), 3-chloro-2-hydroxypropyl methacrylate (1.15 g), N-methylolacrylamide (4.8 g), pure water (516 g), tripropylene glycol (62.97 g), acetic acid (1.14 g), di-hardened beef tallow alkyl dimethyl ammonium chloride (5.16 g), sorbitan monopalmitate (3.6 g), polyoxyethylene oleyl ether (3.6 g) and polyoxyethylenepolyoxypropylene cetyl ether (11.1 g) were charged into a 1 L autoclave, and emulsified by ultrasound at 60° C. for 15 minutes with stirring. After emulsification, n-dodecyl mercaptan (11.5 g) was added, and vinyl chloride (56.0 g) was injected. 2,2'-azobis(2-amidinopropane)dihydrochloride (1.70 g) was added and the reaction was conducted at 60° C. for 5 hours to give an aqueous emulsion of polymer. The composition of the polymer was such that the conversion of vinyl chloride was about 85% and the conversions of the other monomers were about 100%. Polyoxyethylene sorbitan monolaurate (3 g) was added to the aqueous emulsion and stirred for 1 hour to give an aqueous dispersion (Polymer concentration: 30% by weight).

Preparative Example 4

C$_4$F$_9$CH$_2$CH$_2$OCOCH=CH$_2$ (150 g), stearyl acrylate (19.4 g), 3-chloro-2-hydroxypropyl methacrylate (1.15 g), N-methylolacrylamide (4.8 g), pure water (516 g), tripropylene glycol (62.97 g), acetic acid (1.14 g), di-hardened beef tallow alkyl dimethyl ammonium chloride (5.16 g), sorbitan monopalmitate (3.6 g), polyoxyethylene oleyl ether (3.6 g) and polyoxyethylenepolyoxypropylene cetyl ether (11.1 g) were charged into a 1 L autoclave, and emulsified by ultrasound at 60° C. for 15 minutes with stirring. After emulsification, n-dodecyl mercaptan (11.5 g) was added, and vinyl chloride (56.0 g) was injected. 2,2'-azobis(2-amidinopropane) dihydrochloride (1.70 g) was added and the reaction was conducted at 60° C. for 5 hours to give an aqueous emulsion of polymer. The composition of the polymer was such that the conversion of vinyl chloride was about 85% and the conversions of the other monomers were about 100%. Polyoxyethylene sorbitan monolaurate (3 g) was added to the aqueous emulsion and stirred for 1 hour to give an aqueous dispersion (Polymer concentration: 30% by weight).

Example 1

The fluorine-containing urethane compound (2 g) synthesized in Preparative Example 1 and methyl isobutyl ketone (MIBK) (2 g) were mixed and heated at 75° C. to 80° C. for 10 minutes. In another vessel, pure water (15.6 g), polyoxyethylenealkyl ether (nonionic emulsifier) (0.24 g) and sodium alpha-olefin sulfonate (anionic emulsifier) (0.1 g) were mixed and warmed at 75° C. to 80° C. for 10 minutes. These two liquids were mixed and emulsified by an ultrasonic emulsifier to give an emulsion.

Water was added to the resultant emulsion (4.4 g) and the emulsion (0.4 g) prepared in Preparative Example 3 to give the total amount of 100 g which was a treatment liquid. This treatment liquid was used for spray treatment on a carpet (20 cm×20 cm, nylon 6, loop pile (density of 26 oz/yd$^2$)) at WPU (Wet Pick Up) of 30% (when 30 g of the liquid is positioned in 100 g of carpet, WPU is 30%). Then the thermal curing was conducted at 120° C. for 10 minutes.

Next, the water repellency test, the oil repellency test and the soil resistance test were conducted. The results are shown in Table 3.

Example 2

An emulsion was prepared from the fluorine-containing urethane compound synthesized in Preparative Example 1 in the same manner as in Example 1. Water was added to the resultant emulsion (3.6 g) and the emulsion (0.6 g) prepared in Preparative Example 3 to give the total amount of 100 g which was a treatment liquid. The carpet was treated with the repellent treatment liquid in the same manner as in Example 1.

Next, the water repellency test, the oil repellency test and the soil resistance test were conducted. The results are shown in Table 3.

Example 3

An emulsion was prepared from the fluorine-containing urethane compound synthesized in Preparative Example 1 in the same manner as in Example 1. Water was added to the resultant emulsion (2.7 g) and the emulsion (0.9 g) prepared in Preparative Example 3 to give the total amount of 100 g which was a treatment liquid. The carpet was treated with the repellent treatment liquid in the same manner as in Example 1.

Next, the water repellency test, the oil repellency test and the soil resistance test were conducted. The results are shown in Table 3.

Example 4

The fluorine-containing urethane compound (2 g) synthesized in Preparative Example 1 and methyl isobutyl ketone (MIBK) (2 g) were mixed and heated at 75° C. to 80° C. for 10 minutes. In another vessel, pure water (15.6 g), polyoxyethylenealkyl ether (nonionic emulsifier) (0.24 g) and sodium alpha-olefin sulfonate (anionic emulsifier) (0.1 g) were mixed and warmed at 75° C. to 80° C. for 10 minutes. These two liquids were mixed and emulsified by an ultrasonic emulsifier to give an emulsion.

The emulsion (0.4 g) prepared in Preparative Example 3, a stain blocking agent A (6 g) and water were added to the resultant emulsion (4.4 g) to give a dilution liquid having the total amount of 1,000 g, to which a 10% aqueous solution of sulfamic acid was added for adjusting the pH of 1.5 to give a treatment liquid. A carpet (20 cm×20 cm, nylon 6, loop pile (density of 32 oz/yd$^2$)), which was previously washed with water and squeezed at WPU (Wet Pick Up) of 25% (when 25 g of the liquid is positioned in 100 g of carpet, WPU is 25%), was immersed into this treatment liquid for 30 seconds and squeezed at WPU (Wet Pick Up) of 300%. The fluorine content on the treated carpet was 500 ppm. A normal pressure steamer treatment (temperature: 100 to 107° C.) was conducted for 90 seconds at the state that a pile surface of the carpet is upward. The carpet was rinsed with water (10 L), and the centrifugal dehydration was conducted to give the WPU of 25%. Finally, the thermal curing was conducted at 110° C. for 10 minutes.

Next, the water repellency test, the oil repellency test and the soil resistance test were conducted. The results are shown in Table 4.

Example 5

An emulsion was prepared from the fluorine-containing urethane compound synthesized in Preparative Example 1 in the same manner as in Example 4. The emulsion (0.6 g) prepared in Preparative Example 3, a stain blocking agent A (6 g) and water were added to the resultant emulsion (3.6 g) to give a dilution liquid having the total amount of 1,000 g, to which a 10% aqueous solution of sulfamic acid was added for adjusting the pH of 1.5 to give a treatment liquid. The carpet was treated with the repellent treatment liquid in the same manner as in Example 4.

Next, the water repellency test, the oil repellency test and the soil resistance test were conducted. The results are shown in Table 4.

Example 6

An emulsion was prepared from the fluorine-containing urethane compound synthesized in Preparative Example 1 in the same manner as in Example 4. The emulsion (0.9 g) prepared in Preparative Example 3, a stain blocking agent A (6 g) and water were added to the resultant emulsion (2.7 g) to give a dilution liquid having the total amount of 1,000 g, to which a 10% aqueous solution of sulfamic acid was added for adjusting the pH of 1.5 to give a treatment liquid. The carpet was treated with the repellent treatment liquid in the same manner as in Example 4.

Next, the water repellency test, the oil repellency test and the soil resistance test were conducted. The results are shown in Table 4.

Example 7

An emulsion was prepared from the fluorine-containing urethane compound synthesized in Preparative Example 2 in the same manner as in Example 1. Water was added to the resultant emulsion (4.7 g) and the emulsion (0.4 g) prepared in Preparative Example 3 to give the total amount of 100 g which was a treatment liquid. The carpet was treated with the repellent treatment liquid in the same manner as in Example 1.

Next, the water repellency test, the oil repellency test and the soil resistance test were conducted. The results are shown in Table 5.

Example 8

An emulsion was prepared from the fluorine-containing urethane compound synthesized in Preparative Example 2 in the same manner as in Example 1. Water was added to the resultant emulsion (3.8 g) and the emulsion (0.6 g) prepared in Preparative Example 3 to give the total amount of 100 g which was a treatment liquid. The carpet was treated with the repellent treatment liquid in the same manner as in Example 1.

Next, the water repellency test, the oil repellency test and the soil resistance test were conducted. The results are shown in Table 5.

Example 9

An emulsion was prepared from the fluorine-containing urethane compound synthesized in Preparative Example 2 in the same manner as in Example 1. Water (94.7 g) was added to the resultant emulsion (2.9 g) and the emulsion (0.9 g) prepared in Preparative Example 3 to give the total amount of 100 g which was a treatment liquid. The carpet was treated with the repellent treatment liquid in the same manner as in Example 1.

Next, the water repellency test, the oil repellency test and the soil resistance test were conducted. The results are shown in Table 5.

Example 10

An emulsion was prepared from the fluorine-containing urethane compound synthesized in Preparative Example 2 in the same manner as in Example 4. The emulsion (0.4 g) prepared in Preparative Example 3, a stain blocking agent A (6 g) and water were added to the resultant emulsion (4.7 g) to give a dilution liquid having the total amount of 1,000 g, to which a 10% aqueous solution of sulfamic acid was added for adjusting the pH of 1.5 to give a treatment liquid. The carpet was treated with the repellent treatment liquid in the same manner as in Example 4.

Next, the water repellency test, the oil repellency test and the soil resistance test were conducted. The results are shown in Table 6.

Example 11

An emulsion was prepared from the fluorine-containing urethane compound synthesized in Preparative Example 2 in the same manner as in Example 4. The emulsion (0.6 g) prepared in Preparative Example 3, a stain blocking agent A. (6 g) and water were added to the resultant emulsion (3.8 g) to give a dilution liquid having the total amount of 1,000 g, to which a 10% aqueous solution of sulfamic acid was added for adjusting the pH of 1.5 to give a treatment liquid. The carpet was treated with the repellent treatment liquid in the same manner as in Example 4.

Next, the water repellency test, the oil repellency test and the soil resistance test were conducted. The results are shown in Table 6.

Example 12

An emulsion was prepared from the fluorine-containing urethane compound synthesized in Preparative Example 2 in the same manner as in Example 4. The emulsion (0.9 g) prepared in Preparative Example 3, a stain blocking agent A (6 g) and water were added to the resultant emulsion (2.9 g) to give a dilution liquid having the total amount of 1,000 g, to which a 10% aqueous solution of sulfamic acid was added for adjusting the pH of 1.5 to give a treatment liquid. The carpet was treated with the repellent treatment liquid in the same manner as in Example 4.

Next, the water repellency test, the oil repellency test and the soil resistance test were conducted. The results are shown in Table 6.

Comparative Example 1

An emulsion was prepared from the fluorine-containing urethane compound synthesized in Preparative Example 1 in the same manner as in Example 1. Water was added to the resultant emulsion (5.5 g) to give the total amount of 100 g which was a treatment liquid. The carpet was treated with the repellent treatment liquid in the same manner as in Example 1.

Next, the water repellency test, the oil repellency test and the soil resistance test were conducted. The results are shown in Table 3.

Comparative Example 2

Water was added to the emulsion (1.8 g) prepared in Preparative Example 3 to give the total amount of 100 g which was a treatment liquid. The carpet was treated with the repellent treatment liquid in the same manner as in Example 1.

Next, the water repellency test, the oil repellency test and the soil resistance test were conducted. The results are shown in Table 3.

Comparative Example 3

An emulsion was prepared from the fluorine-containing urethane compound synthesized in Preparative Example 1 in the same manner as in Example 1. Water was added to the resultant emulsion (4.4 g) and the emulsion (0.3 g) prepared in Preparative Example 4 to give the total amount of 100 g which was a treatment liquid. The carpet was treated with the repellent treatment liquid in the same manner as in Example 1.

Next, the water repellency test, the oil repellency test and the soil resistance test were conducted. The results are shown in Table 3.

Comparative Example 4

An emulsion was prepared from the fluorine-containing urethane compound synthesized in Preparative Example 1 in the same manner as in Example 1. Water was added to the resultant emulsion (3.6 g) and the emulsion (0.6 g) prepared in Preparative Example 4 to give the total amount of 100 g which was a treatment liquid. The carpet was treated with the repellent treatment liquid in the same manner as in Example 1.

Next, the water repellency test, the oil repellency test and the soil resistance test were conducted. The results are shown in Table 3.

Comparative Example 5

An emulsion was prepared from the fluorine-containing urethane compound synthesized in Preparative Example 1 in the same manner as in Example 1. Water was added to the resultant emulsion (2.7 g) and the emulsion (0.8 g) prepared in Preparative Example 4 to give the total amount of 100 g which was a treatment liquid. The carpet was treated with the repellent treatment liquid in the same manner as in Example 1.

Next, the water repellency test, the oil repellency test and the soil resistance test were conducted. The results are shown in Table 3.

Comparative Example 6

Water was added to the emulsion (1.6 g) prepared in Preparative Example 4 to give the total amount of 100 g which was a treatment liquid. The carpet was treated with the repellent treatment liquid in the same manner as in Example 1.

Next, the water repellency test, the oil repellency test and the soil resistance test were conducted. The results are shown in Table 3.

Comparative Example 7

An emulsion was prepared from the fluorine-containing urethane compound synthesized in Preparative Example 1 in the same manner as in Example 4. Water was added to the resultant emulsion (5.5 g) and a stain blocking agent A (5 g) to give a dilution liquid having the total amount of 1,000 g, to which a 10% aqueous solution of sulfamic acid was added for adjusting the pH of 1.5 to give a treatment liquid. The carpet was treated with the repellent treatment liquid in the same manner as in Example 4.

Next, the water repellency test, the oil repellency test and the soil resistance test were conducted. The results are shown in Table 4.

Comparative Example 8

Water was added to the emulsion (1.8 g) synthesized in Preparative Example 3 and a stain blocking agent A (5 g) to give a dilution liquid having the total amount of 1,000 g, to which a 10% aqueous solution of sulfamic acid was added for adjusting the pH of 1.5 to give a treatment liquid. The carpet was treated with the repellent treatment liquid in the same manner as in Example 4.

Next, the water repellency test, the oil repellency test and the soil resistance test were conducted. The results are shown in Table 4.

Comparative Example 9

An emulsion was prepared from the fluorine-containing urethane compound synthesized in Preparative Example 1 in the same manner as in Example 4. Water was added to the resultant emulsion (4.4 g), the emulsion (0.3 g) synthesized in Preparative Example 4 and a stain blocking agent A (5 g) to give a dilution liquid having the total amount of 1,000 g, to which a 10% aqueous solution of sulfamic acid was added for adjusting the pH of 1.5 to give a treatment liquid. The carpet was treated with the repellent treatment liquid in the same manner as in Example 4.

Next, the water repellency test, the oil repellency test and the soil resistance test were conducted. The results are shown in Table 4.

Comparative Example 10

An emulsion was prepared from the fluorine-containing urethane compound synthesized in Preparative Example 1 in the same manner as in Example 4. Water was added to the resultant emulsion (3.6 g), the emulsion (0.6 g) synthesized in Preparative Example 4 and a stain blocking agent A (5 g) to give a dilution liquid having the total amount of 1, 000 g, to which a 10% aqueous solution of sulfamic acid was added for adjusting the pH of 1.5 to give a treatment liquid. The carpet was treated with the repellent treatment liquid in the same manner as in Example 4.

Next, the water repellency test, the oil repellency test and the soil resistance test were conducted. The results are shown in Table 4.

Comparative Example 11

An emulsion was prepared from the fluorine-containing urethane compound synthesized in Preparative Example 1 in the same manner as in Example 4. Water was added to the resultant emulsion (2.7 g), the emulsion (0.9 g) synthesized in Preparative Example 4 and a stain blocking agent A (5 g) to give a dilution liquid having the total amount of 1,000 g, to which a 10% aqueous solution of sulfamic acid was added for adjusting the pH of 1.5 to give a treatment liquid. The carpet was treated with the repellent treatment liquid in the same manner as in Example 4.

Next, the water repellency test, the oil repellency test and the soil resistance test were conducted. The results are shown in Table 4.

Comparative Example 12

Water was added to the emulsion (1.6 g) synthesized in Preparative Example 4 and a stain blocking agent A (5 g) to give a dilution liquid having the total amount of 1,000 g, to which a 10% aqueous solution of sulfamic acid was added for adjusting the pH of 1.5 to give a treatment liquid. The carpet was treated with the repellent treatment liquid in the same manner as in Example 4.

Next, the water repellency test, the oil repellency test and the soil resistance test were conducted. The results are shown in Table 4.

Comparative Example 13

An emulsion was prepared from the fluorine-containing urethane compound synthesized in Preparative Example 2 in the same manner as in Example 1. Water was added to the resultant emulsion (5.9 g) to give the total amount of 100 g which was a treatment liquid. The carpet was treated with the repellent treatment liquid in the same manner as in Example 1.

Next, the water repellency test, the oil repellency test and the soil resistance test were conducted. The results are shown in Table 5.

Comparative Example 14

An emulsion was prepared from the fluorine-containing urethane compound synthesized in Preparative Example 2 in the same manner as in Example 1. Water was added to the resultant emulsion (4.7 g) and the emulsion (0.3 g) synthesized in Preparative Example 4 to give the total amount of 100 g which was a treatment liquid. The carpet was treated with the repellent treatment liquid in the same manner as in Example 1.

Next, the water repellency test, the oil repellency test and the soil resistance test were conducted. The results are shown in Table 5.

Comparative Example 15

An emulsion was prepared from the fluorine-containing urethane compound synthesized in Preparative Example 2 in the same manner as in Example 1. Water was added to the resultant emulsion (3.8 g) and the emulsion (0.6 g) synthesized in Preparative Example 4 to give the total amount of 100 g which was a treatment liquid. The carpet was treated with the repellent treatment liquid in the same manner as in Example 1.

Next, the water repellency test, the oil repellency test and the soil resistance test were conducted. The results are shown in Table 5.

Comparative Example 16

An emulsion was prepared from the fluorine-containing urethane compound synthesized in Preparative Example 2 in the same manner as in Example 1. Water was added to the resultant emulsion (2.9 g) and the emulsion (0.8 g) synthesized in Preparative Example 4 to give the total amount of 100 g which was a treatment liquid. The carpet was treated with the repellent treatment liquid in the same manner as in Example 1.

Next, the water repellency test, the oil repellency test and the soil resistance test were conducted. The results are shown in Table 5.

Comparative Example 17

An emulsion was prepared from the fluorine-containing urethane compound synthesized in Preparative Example 2 in the same manner as in Example 4. Water was added to the resultant emulsion (5.9 g) and a stain blocking agent A (5 g) to give a dilution liquid having the total amount of 1,000 g, to which a 10% aqueous solution of sulfamic acid was added for adjusting the pH of 1.5 to give a treatment liquid. The carpet was treated with the repellent treatment liquid in the same manner as in Example 4.

Next, the water repellency test, the oil repellency test and the soil resistance test were conducted. The results are shown in Table 6.

Comparative Example 18

An emulsion was prepared from the fluorine-containing urethane compound synthesized in Preparative Example 2 in the same manner as in Example 4. Water was added to the resultant emulsion (4.7 g), the emulsion (0.3 g) synthesized in Preparative Example 4 and a stain blocking agent A (5 g) to give a dilution liquid having the total amount of 1,000 g, to which a 10% aqueous solution of sulfamic acid was added for adjusting the pH of 1.5 to give a treatment liquid. The carpet was treated with the repellent treatment liquid in the same manner as in Example 4.

Next, the water repellency test, the oil repellency test and the soil resistance test were conducted. The results are shown in Table 6.

Comparative Example 19

An emulsion was prepared from the fluorine-containing urethane compound synthesized in Preparative Example 2 in the same manner as in Example 4. Water was added to the resultant emulsion (3.8 g), the emulsion (0.6 g) synthesized in Preparative Example 4 and a stain blocking agent A (5 g) to give a dilution liquid having the total amount of 1,000 g, to which a 10% aqueous solution of sulfamic acid was added for adjusting the pH of 1.5 to give a treatment liquid. The carpet was treated with the repellent treatment liquid in the same manner as in Example 4.

Next, the water repellency test, the oil repellency test and the soil resistance test were conducted. The results are shown in Table 6.

Comparative Example 20

An emulsion was prepared from the fluorine-containing urethane compound synthesized in Preparative Example 2 in the same manner as in Example 4. Water was added to the resultant emulsion (2.9 g), the emulsion (0.8 g) synthesized in Preparative Example 4 and a stain blocking agent A (5 g) to give a dilution liquid having the total amount of 1,000 g, to which a 10% aqueous solution of sulfamic acid was added for adjusting the pH of 1.5 to give a treatment liquid. The carpet was treated with the repellent treatment liquid in the same manner as in Example 4.

Next, the water repellency test, the oil repellency test and the soil resistance test were conducted. The results are shown in Table 6.

TABLE 3

|  | Water repellency | Oil repellency | Soil resistance |
| --- | --- | --- | --- |
| Comparative Example 1 | 2 | 2 | 5 |
| Example 1 | 3 | 3 | 5 |
| Example 2 | 3 | 3 | 5 |
| Example 3 | 3 | 3 | 4 |
| Comparative Example 2 | 3 | 3 | 2 |
| Comparative Example 3 | 2 | 1 | 5 |
| Comparative Example 4 | 2 | 1 | 5 |
| Comparative Example 5 | 2 | 1 | 4 |
| Comparative Example 6 | 2 | 1 | 1 |

TABLE 4

|  | Water repellency | Oil repellency | Soil resistance |
| --- | --- | --- | --- |
| Comparative Example 7 | 2 | 2 | 5 |
| Example 4 | 3 | 3 | 5 |
| Example 5 | 3 | 3 | 5 |
| Example 6 | 3 | 2 | 4 |
| Comparative Example 8 | 3 | 3 | 2 |
| Comparative Example 9 | 2 | 1 | 5 |
| Comparative Example 10 | 2 | 1 | 5 |
| Comparative Example 11 | 2 | 1 | 4 |
| Comparative Example 12 | 2 | 1 | 1 |

TABLE 5

|  | Water repellency | Oil repellency | Soil resistance |
|---|---|---|---|
| Comparative Example 13 | Fail | Fail | 3 |
| Example 7 | 3 | 3 | 3 |
| Example 8 | 3 | 3 | 3 |
| Example 9 | 2 | 2 | 3 |
| Comparative Example 2 | 3 | 3 | 2 |
| Comparative Example 14 | 2 | 1 | 3 |
| Comparative Example 15 | 2 | 1 | 2 |
| Comparative Example 16 | 2 | 1 | 2 |
| Comparative Example 6 | 2 | 1 | 1 |

TABLE 6

|  | Water repellency | Oil repellency | Soil resistance |
|---|---|---|---|
| Comparative Example 17 | 1 | 1 | 3 |
| Example 10 | 3 | 3 | 3 |
| Example 11 | 3 | 3 | 3 |
| Example 12 | 2 | 2 | 3 |
| Comparative Example 8 | 3 | 3 | 2 |
| Comparative Example 18 | 2 | 1 | 3 |
| Comparative Example 19 | 2 | 1 | 2 |
| Comparative Example 20 | 2 | 1 | 2 |
| Comparative Example 12 | 2 | 1 | 1 |

Industrial Applicability

The treatment composition of the present invention is useful as a surface treatment agent for surface-treating various substrates (for example, a water- and oil-repellent agent and a soil resistance agent).

The invention claimed is:

1. a composition comprising:
(A) a fluorine-containing urethane compound of the formula:

[Rf-A$^1$-Z—X$^1$—OC(=O)NH—]$_m$I[—NHC(=O)O—Y$^1$]$_n$ wherein,
I is a group remaining after an isocyanate group is removed from an isocyanurate-modified diisocyanate,
Rf is a perfluoroalkyl group having 1 to 6 carbon atoms,
A$^1$ is a direct bond or a divalent organic group having 1 to 21 carbon atoms,
Z is —S— or —SO$_2$—,
X$^1$ is a direct bond, or a divalent linear or branched aliphatic group having 1 to 5 carbon atoms optionally having at least one hydroxyl group,
Y$^1$ is a monovalent organic group optionally having a hydroxyl group,
m is the number of 1 to 15,
n is the number of 0 to 14, and
the total of m and n is the number of 2 to 15, and
(B) a fluorine-containing polymer comprising repeating units derived from a fluorine-containing monomer of the formula:

CH$_2$=C(—X)—C(=O)-A-Rf    (I)

wherein X is a fluorine atom, a chlorine atom, a bromine atom, an iodine atom, a CFX$^1$X$^2$ group (in which X$^1$ and X$^2$ respectively represent a hydrogen atom, a fluorine atom or a chlorine atom), a cyano group, a linear or branched fluoroalkyl group having 1 to 20 carbon atoms, a substituted or unsubstituted benzyl group, or a substituted or unsubstituted phenyl group;

A is —O—Y$^1$— (in which Y$^1$ is an aliphatic group having 1 to 10 carbon atoms, an aromatic or cycloaliphatic group having 6 to 10 carbon atoms, a —CH$_2$CH$_2$N(R$^1$)SO$_2$—(CH$_2$CH$_2$)$_a$— group (in which R$^1$ is an alkyl group having 1 to 4 carbon atoms, and a is 0 or 1) or a —CH$_2$CH(OR$^{11}$)CH$_2$— group (in which R$^{11}$ is a hydrogen atom or an acetyl group)), or —Y$^2$—[—(CH$_2$)$_m$—Z—]$_p$—(CH$_2$)$_n$— (in which Y$^2$ is —O— or —NH—; Z is —S— or —SO$_2$—; m is 1 to 10, n is 0 to 10, and p is 0 or 1); and
Rf is a linear or branched perfluoroalkyl group having 1 to 6 carbon atoms.

2. The composition according to claim 1, wherein the fluorine-containing urethane compound (A) is of the formula:

[Rf-A$^1$-Z—X$^1$—OC(=O)NH—]$_m$I    (3)

wherein I is a group remaining after an isocyanate group is removed from an isocyanurate-modified diisocyanate,
Rf is a perfluoroalkyl group having 1 to 6 carbon atoms,
A$^1$ is a direct bond or a divalent organic group having 1 to 21 carbon atoms,
Z is —S— or —SO$_2$—,
X$^1$ is a direct bond, or a divalent linear or branched aliphatic group having 1 to 5 carbon atoms optionally having at least one hydroxyl group, and
m is the number of 2 to 15.

3. The composition according to claim 1, wherein the fluorine-containing polymer (B) comprises:
(B-1) repeating units derived from a fluorine-containing monomer of the formula:

CH$_2$=C(—X)—C(=O)-A-Rf    (I)

wherein X is a fluorine atom, a chlorine atom, a bromine atom, an iodine atom, a CFX$^1$X$^2$ group (in which X$^1$ and X$^2$ respectively represent a hydrogen atom, a fluorine atom or a chlorine atom), a cyano group, a linear or branched fluoroalkyl group having 1 to 20 carbon atoms, a substituted or unsubstituted benzyl group, or a substituted or unsubstituted phenyl group;
A is —O—Y$^1$— (in which Y$^1$ is an aliphatic group having 1 to 10 carbon atoms, an aromatic or cycloaliphatic group having 6 to 10 carbon atoms, a —CH$_2$CH$_2$N(R$^1$)SO$_2$—(CH$_2$CH$_2$)$_a$— group (in which R$^1$ is hydrogen or an alkyl group having 1 to 4 carbon atoms, and a is 0 or 1.) or a —CH$_2$CH(OR$^{11}$)CH$_2$— group (in which R$^{11}$ is a hydrogen atom or an acetyl group.)), or —Y$^2$—[—(CH$_2$)$_m$—Z—]$_p$—(CH$_2$)$_n$— (in which Y$^2$ is —O— or —NH—; Z is —S— or —SO$_2$—; m is 1 to 10, n is 0 to 10, and p is 0 or 1.);
Rf is a linear or branched perfluoroalkyl group having 1 to 6 carbon atoms,
(B-2) repeating units derived from a monomer free from a fluorine atom, and
(B-3) optionally present, repeating units derived from a crosslinkable monomer.

4. The composition according to claim 3, wherein, in the repeating units (B-1), the carbon number of the Rf group is from 1 to 4.

5. The composition according to claim 3, wherein the monomer free from a fluorine atom forming the repeating units (B-2) is fluorine-free acrylates of the general formula:

CH$_2$=CA$^1$COOA$^2$ wherein A$^1$ is a hydrogen atom or a methyl group, and
A$^2$ is a C$_{1-30}$ hydrocarbon group optionally having an oxygen atom.

6. The composition according to claim 5, wherein the $A^2$ group in the repeating units (B-2) is an alkyl group represented by $-C_nH_{2n+1}$ (n=1 to 30) or an alkoxide group represented by $-(A^{11}-O)_p-A^{12}$ (in which $A^{11}$ is an alkyl group having 2 to 5 carbon atoms, $A^{12}$ is a hydrogen atom or an alkyl group having 1 to 5 carbon atoms, and p is from 1 to 20).

7. The composition according to claim 3, wherein the crosslinkable monomer forming the repeating units (B-3) is a fluorine-free monomer having at least two reactive groups and/or carbon-carbon double bonds.

8. The composition according to claim 3, wherein, in the fluorine-containing polymer (B), the amount of the fluorine atom-free monomer is from 0.1 to 50 parts by weight, and the amount of the crosslinkable monomer is at most 20 parts by weight, based on 100 parts by weight of the fluorine-containing monomer.

9. The composition according to claim 1, wherein the weight ratio of the fluorine-containing urethane compound (A) to the fluorine-containing polymer (B) is from 5:95 to 95:5.

10. The composition according to claim 1, wherein at least one of the fluorine-containing urethane compound (A) and the fluorine-containing polymer (B) has an oxyalkylene group in which the carbon number of the alkylene group is from 2 to 5, particularly 2 or 3.

11. The composition according to claim 1, which further contains (C) a silicon-containing compound.

12. The composition according to claim 10, wherein the silicon-containing compound (C) is at least one selected from the group consisting of a silicone oil, a modified silicone and a silicone resin.

13. The composition according to claim 1, which is in the form of a solution, an emulsion or an aerosol.

14. The composition according to claim 1, which further contains an emulsifier and water.

15. The composition according to claim 1, which is a surface treatment agent.

16. The composition according to claim 1, which is a water- and oil-repellent agent or a soil resistant agent.

17. A method of surface-treating a substrate, which comprises applying the composition as claimed in claim 1 to the substrate.

18. The method according to claim 17, wherein the substrate is a textile, masonry, a filter, a dust protective mask, a fuel cell, glass, paper, wood, leather, fur, asbestos, brick, cement, metal and oxide, ceramics, plastics, a coated surface and a plaster.

19. The method according to claim 17, wherein a textile is subjected to a treatment comprising steps of:
(1) preparing a treatment liquid comprising the composition of claim 1 and having pH of at most 7,
(2) applying the treatment liquid to the textile,
(3) treating the textile with steam, and
(4) washing the textile with water and dehydrating the textile.

20. A textile treated with the composition according to claim 1.

21. A carpet treated with the composition according to claim 1.

22. A composition comprising:
(A) a fluorine-containing urethane compound of the formula:

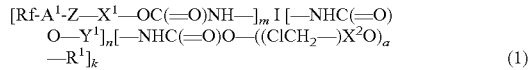

(1)

wherein I is a group remaining after an isocyanate group is removed from an isocyanurate-modified diisocyanate,
Rf is a perfluoroalkyl group having 1 to 6 carbon atoms,
$A^1$ is a direct bond or a divalent organic group having 1 to 21 carbon atoms,
Z is a —S— or —$SO_2$—,
$X^1$ is a direct bond, or a divalent linear or branched aliphatic group having 1 to 5 carbon atoms optionally having at least one hydroxyl group,
$X^2$ is a trivalent linear or branched aliphatic group having 2 to 5 carbon atoms,
$Y^1$ is a monovalent organic group optionally having a hydroxyl group,
$R^1$ is a hydrogen atom or an alkyl group having 1 to 10 carbon atoms,
a is the number of 1 to 20,
m is the number of 1 to 15,
n and k are the number of 0 to 14, and
the total of m, n and k is the number of 2 to 15, and
(B) a fluorine-containing polymer comprising repeating units derived from a fluorine-containing monomer of the formula:

$$CH_2=C(-X)-C(=O)-A-Rf \quad (I)$$

wherein X is a fluorine atom, a chlorine atom, a bromine atom, an iodine atom, a $CFX^1X^2$ group (in which $X^1$ and $X^2$ respectively represent a hydrogen atom, a fluorine atom or a chlorine atom), a cyano group, a linear or branched fluoroalkyl group having 1 to 20 carbon atoms, a substituted or unsubstituted benzyl group, or a substituted or unsubstituted phenyl group;
A is —O—$Y^1$— (in which $Y^1$ is an aliphatic group having 1 to 10 carbon atoms, an aromatic or cycloaliphatic group having 6 to 10 carbon atoms, a —$CH_2CH_2N(R^1)SO_2$—$(CH_2CH_2)_a$— group (in which $R^1$ is an alkyl group having 1 to 4 carbon atoms, and a is 0 or 1) or a —$CH_2CH(OR^{11})CH_2$— group (in which $R^{11}$ is a hydrogen atom or an acetyl group)), or
—$Y^2$—[—$(CH_2)_m$—Z—]$_p$—$(CH_2)_n$— (in which $Y^2$ is —O— or —NH—; Z is —S— or —$SO_2$—; m is 1 to 10, n is 0 to 10, and p is 0 or 1); and
Rf is a linear or branched perfluoroalkyl group having 1 to 6 carbon atoms.

23. The composition according to claim 22, wherein, in the fluorine-containing urethane compound (A), the $A^1$ group is of the formula:

—$(CH_2)_p$—

—$CONR^{11}$—$R^{12}$—

—$CH_2C(OH)HCH_2$—

—$CH_2C(OCOR^{13})HCH_2$— or

—O—Ar—$CH_2$— wherein $R^{11}$ is hydrogen or an alkyl group having 1 to 10 carbon atoms,
$R^{12}$ is an alkylene group having 1 to 10 carbon atoms,
$R^{13}$ is hydrogen or a methyl group,
Ar is an arylene group (having, for example, 6 to 20 carbon atoms) optionally having a substituent, and
p is an integer of 1 to 10.

24. The composition according to claim 22, wherein, in the fluorine-containing urethane compound (A), the $X^1$ group is:
(i) an alkylene group selected from the group consisting of —$CH_2$—, —$CH_2CH_2$—, —$CH_2CH_2CH_2$—, —$CH_2CH_2CH_2CH_2$—, —$CH_2CH_2CH_2CH_2CH_2$—, —C(CH$_3$)H—, —C(CH$_3$)H—CH$_2$—, —CH$_2$—C(CH$_3$)H—, —CH$_2$—C(CH$_3$)H—CH$_2$—, —C(CH$_3$)H—CH$_2$—CH$_2$—, —C(CH$_3$)H—C(CH$_3$)H—, —CH$_2$—C(CH$_3$)$_2$—CH$_2$—, —C(CH$_3$)H—C(CH$_3$)H—CH$_2$— and —C(CH$_3$)H—CH$_2$—C(CH$_3$)H—, or (ii) an alkylene group having a hydroxyl group, selected from the group consisting of —C(OH)H—, —C(OH)HCH$_2$—, —CH$_2$C(OH)H—, —C(OH)HC(OH)H—, —C(OH)HCH$_2$CH$_2$—, —CH$_2$C(OH)HCH$_2$—, —CH$_2$CH$_2$C(OH)H—, —C(OH)HC(OH)HCH$_2$—, —C(OH)HCH$_2$C(OH)H—, —CH$_2$C(OH)HC(OH)H—, —CH$_2$C(OH)$_2$CH$_2$— and —C(OH)HC(OH)HC(OH)H—.

25. The composition according to claim 22, wherein, in the fluorine-containing urethane compound (A), the Y$^1$ group is of the formula:

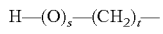

wherein s is 0 or 1, and t is the number of 1 to 5, or

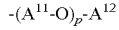

wherein A$^{11}$ is an alkyl group having 2 to 5 carbon atoms, A$^{12}$ is a hydrogen atom or an alkyl group having 1 to 5 carbon atoms, and p is from 0 to 20.

* * * * *